(No Model.)

E. M. CALEF & T. L. TRACY.
CORN PLANTER.

No. 321,186. Patented June 30, 1885.

WITNESSES:
Chas. Nida
C. Sedgwick

INVENTOR:
T. L. Tracy
E. M. Calef
BY Munn & Co
ATTORNEYS.

UNITED STATES PATENT OFFICE.

EDWIN M. CALEF AND TRUMAN L. TRACY, OF MISSOURI VALLEY, IOWA.

CORN-PLANTER.

SPECIFICATION forming part of Letters Patent No. 321,186, dated June 30, 1885.

Application filed January 5, 1885. (No model.)

*To all whom it may concern:*

Be it known that we, EDWIN M. CALEF and TRUMAN L. TRACY, both of Missouri Valley, in the county of Harrison and State of Iowa, have invented certain new and useful Improvements in Corn-Planters, of which the following is a full, clear, and exact description.

Reference is to be had to the accompanying drawings, forming part of this specification, in which similar letters of reference indicate corresponding parts in all the figures.

Figure 1:
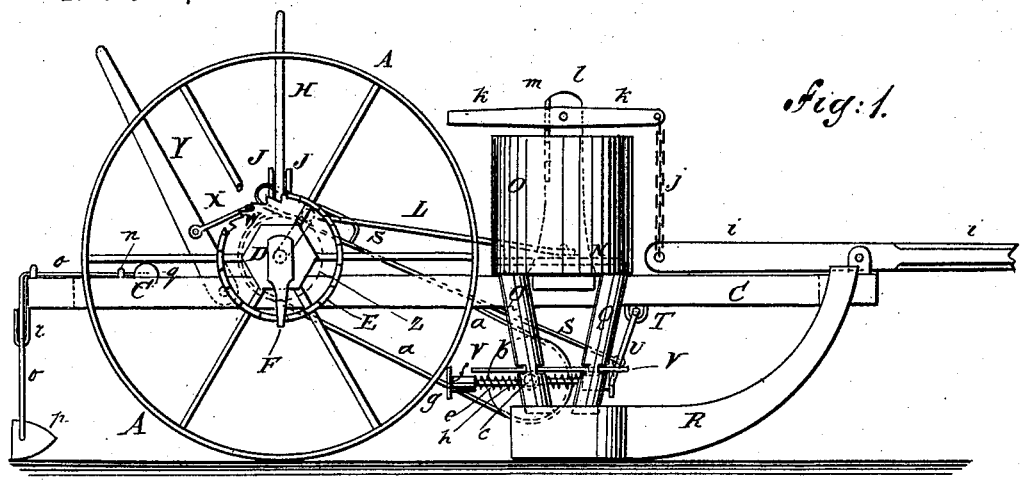
Figure 2:
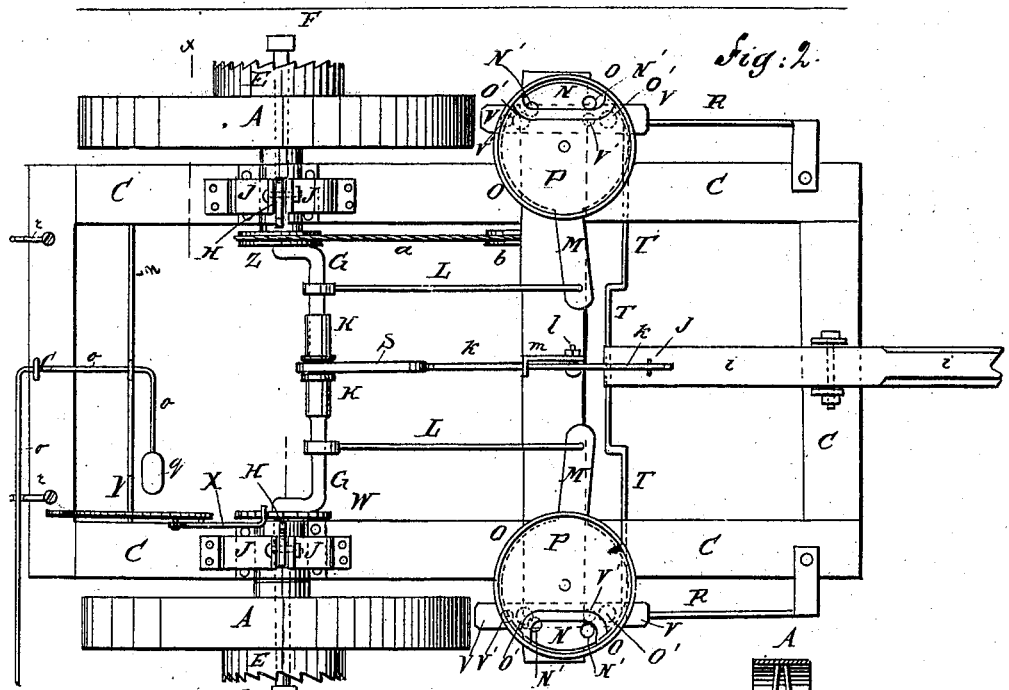
Figure 3:
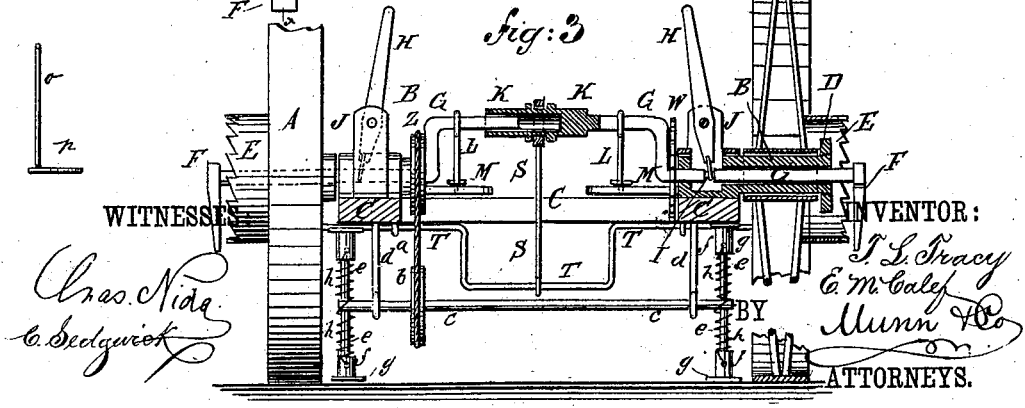

Figure 1 is a side elevation of one of our improved corn-planters, part being broken away. Fig. 2 is a plan view of the same. Fig. 3 is a sectional rear elevation of the same, taken through the broken line x x, Fig. 2.

The object of this invention is to facilitate the planting of corn in accurate check-row, and promote convenience in adjusting the seed-dropping mechanism to keep the cross-rows in line.

The invention consists in the construction and arrangement of parts, as will be hereinafter fully described, and then claimed.

A represents the drive-wheels, which revolve upon hollow journals B, attached to the side bars of the frame C, the said wheels being kept in place by nuts D, screwed upon the ends of the said hollow journals. To the outer sides of the wheels A are attached clutch-wheels E, with which engage clutch fingers or wheels F, attached to the outer ends of the axle G, which passes through the bores of the hollow journals B.

In the upper sides of the inner ends of the hollow journals B are formed openings to receive the lower ends of the levers H, which are forked and ride in annular grooves I, formed in the axle G, so that the said axle can be moved longitudinally to throw the clutches F E out of and into gear by operating the said levers H. The levers H are pivoted to brackets J, attached to the side bars of the frame C.

The axle G, at a little distance from the inner sides of the side bars of the frame C, is bent into crank form, as shown in Figs. 2 and 3. The axle G is made in two parts, so that either part can be moved out and in to throw it out of and into gear with its drive-wheel independently of the other part. Upon the inner end of one part of the axle G is formed or to it is attached a socket, K, to receive the inner end of the other part, so that the two parts of the axle must revolve together, whether both parts are connected with the drive-wheels or only one part is so connected. To the axle G, at a little distance from its bends, are secured by straps, collars, eyes, or other suitable means, the rear ends of two rods, L, the forward ends of which are pivoted to the ends of arms M, formed upon or rigidly attached to the circular plates N, placed upon the bottoms of the cylindrical seed-boxes O, and pivoted at their centers to the centers of the said bottoms. The arms M project through slots in the inner sides of the seed-boxes O. In the lower parts of the seed-boxes O, above the plates N, are placed false bottoms P, the parts of which next the outer sides of the said seed-boxes are cut away, to allow the seed to come in contact with the said plates N and enter the seed-receiving holes N' in the said plates as they are successively exposed by the vibration of the said plates. Each of the two holes N' in each plate N is made of such a size as to contain enough seed for a hill, and carries the seed received in it to an opening, O', in the bottom of the seed-box, and drops the said seed into the upper end of a spout, Q, through which it passes to the ground. Two spouts, Q, are used for each seed-box O, the upper ends of which are attached to the lower side of the bottom of the said seed-box in such positions as to inclose the holes through the said bottom. The lower ends of the pairs of spouts Q are secured in the forked rear ends of the runners R, so as to drop the seed in the bottoms of the channels opened by the said runners R. The forward ends of the runners R are bent inward, or have inwardly-projecting arms attached to them, which ends or arms are secured to the forward corners of the frame C. With this construction two hills will be dropped by each dropping-plate N at each revolution of the crank-axle G.

The middle part of the crank-axle G passes through the slotted rear end of a connecting-rod, S, which slot is made shorter than the diameter of the circle described by the crank of the axle G, so that the rod S will be pushed forward and drawn back at each revolution of the said axle G as the said axle comes to the ends of the slot in the said rod. The forward end of the rod S is pivoted to a crank formed upon the middle part of the shaft T. The shaft T rocks in bearings attached to the lower sides of the side bars of the frame C, and upon its ends are formed or to them are attached crank-arms U, which pass through apertures in the forward ends of the narrow plates V, placed and sliding in slots in the conducting-spouts Q, to receive and stop the seed as it falls from the seed-dropping plates N. Each plate V has two holes, V′, formed through it, as indicated in dotted lines in Fig. 2, in such positions that one of the said holes will enter one of the spouts Q and allow the seed in the said spout to drop to the ground as a seed-receiving hole of the dropping-plate N comes over the other spout Q and drops seed into the said spout, so that the seed will be dropped to the ground in a bunch.

To the axle G is attached a ratchet-wheel, W, with the teeth of which engages a pawl, X, pivoted to a lever, Y. The lever Y is pivoted at its lower end to a side bar of the frame C. The ratchet-wheel W, pawl X, and lever Y are designed for use in adjusting the seed-dropping mechanism when starting in at the ends of the rows and at other times, so that the planting can be done in accurate check-row.

To the axle G is also attached a pulley or chain-wheel, Z, around which passes an endless band or chain, $a$. The band or chain $a$ also passes around a pulley or chain-wheel, $b$, attached to a shaft, $c$, which revolves in bearings in the lower ends of hangers $d$, attached at their upper ends to the frame C.

To the ends of the shaft $c$ are attached the centers of cross-rods $e$, upon the ends of which are placed tubes $f$, having marking plates or feet $g$ attached to their outer ends. The tubes $f$ are held out by spiral springs $h$, attached at their outer ends to the inner ends of the said tubes $f$ and at their inner ends to the ends of the shaft $c$.

The pulleys or chain-wheels Z $b$ are made of equal size, so that the axle G and the shaft $c$ will make their revolutions in equal times, and the shaft $c$ is so arranged that the feet $g$ will come to the ground directly opposite the places where the seed has been dropped, and will thus mark the cross-rows, which marks will serve as guides to the driver, and allow him to so adjust and control the machine that the planting will be done in accurate check-row.

As the feet $g$ come to the ground, the springs $h$ yield and allow the tubes $f$ to slide upward upon the cross-rods $e$, so that the shaft $c$ can continue its revolution without forcing the feet $g$ into the ground, the springs $h$ being made of sufficient strength to cause the feet $g$ to make distinct marks in the ground.

To the forward cross-bar of the frame C is hinged the tongue $i$, the rear end of which projects, and to it is attached the end of a short chain, $j$. The upper end of the chain $j$ is attached to the end of a lever, $k$, which is pivoted to a standard, $l$, attached to a cross-bar of the frame C, so that by operating the lever $k$ the forward end of the machine can be raised or lowered, to adjust the runners R to work at any desired depth in the ground, or to raise them out of contact with the ground for convenience in turning around and in passing from place to place.

The lever $k$ is held in any position into which it may be adjusted by a catch-plate, $m$, attached to the standard $l$, and with which the said lever engages.

In staples or other bearings attached to the center of the rear cross-bar of the frame C, and to a rod or bar, $n$, attached to the rear parts of the side bars of the said frame C, is pivoted a rod, $o$, the rear part of which is bent at right angles, has a shoe, $p$, attached to its outer end, and is made of such a length that the said shoe will rest upon and mark the ground at a distance from the row last planted equal to once and a half the distance apart of the rows, so that the said mark will serve as a guide to the driver in the next passage across the field. The shoe $p$ is so formed as to properly mark the ground whichever side of the said shoe be upward. The forward part of the rod $o$ is bent to one side at right angles, and parallel or nearly parallel with the rear part of the said rod, and to its end is attached a weight, $q$, of sufficient gravity to hold the shoe $p$ down upon the ground with such force as to make a distinct mark.

The rear arm of the rod $o$, when lowered into working position, rests in a hook, $r$, attached to the rear cross-bar of the frame C, to support the said rod against the resistance of the soil to the shoe $p$. With this construction the driver can adjust the marker without getting off the machine.

Having thus described my invention, what I claim as new and desire to secure by Letters Patent, is—

1. In a corn-planter, the combination, with the crank-axle G at the rear part of the frame, and the rods L S, of the seed-box O, having an apertured false bottom, P, and spouts Q Q, the pivoted plate N, having seed-receiving holes constructed to be brought into line with the spouts, and an arm, M, extending through the side of the seed-box and connected to rod L, the crank-lever T, journaled below the seed-box, connected with the rod S, and provided with crank-arm U, and the horizontal plate V, passed through slots in both spouts, provided with holes V′, and connected to the crank-arm U, substantially as set forth.

2. In a corn-planter, the combination, with the axle G, the frame C, and the hangers $d$, of the shaft $c$, pulleys Z $b$ on the axle and shaft G $c$, respectively, the band $a$, connecting the same, the cross-rods $e$, rigidly secured to the ends of the shaft $c$, the tubes $f$, mounted to slide on the rods $e$, and provided with feet $g$, and spiral springs $h$ on the rods $e$, between the shaft c and the tubes f, substantially as set forth.

3. In a corn-planter, the combination, with the frame C, provided at its rear end with a cross-rod, n, of the rod o, journaled on the rear cross-bar of the frame and on the rod n, the said rod being bent downward at right angles to its rear arm, and there provided with a shoe, p, the forward arm being parallel with the rear arm, and provided with a weight, q, substantially as set forth.

EDWIN M. CALEF.
     TRUMAN L. TRACY.

Witnesses:
 J. P. PRATT,
 F. M. TERRY.